(12) United States Patent
Baek et al.

(10) Patent No.: US 8,399,111 B2
(45) Date of Patent: Mar. 19, 2013

(54) BATTERY PACK

(75) Inventors: Woon-Seong Baek, Suwon-si (KR);
Heui-Sang Yoon, Suwon-si (KR);
Jong-Wook Yoon, Suwon-si (KR)

(73) Assignee: Samsung SDI Co., Ltd., Gongse-dong, Giheung-gu, Yongin-si, Gyeonggi-do (KR)

( * ) Notice: Subject to any disclaimer, the term of this patent is extended or adjusted under 35 U.S.C. 154(b) by 321 days.

(21) Appl. No.: 12/910,115

(22) Filed: Oct. 22, 2010

(65) Prior Publication Data

US 2011/0129695 A1    Jun. 2, 2011

(30) Foreign Application Priority Data

Nov. 30, 2009  (KR) .................. 10-2009-0116671

(51) Int. Cl.
*H01M 2/02* (2006.01)
*H01M 2/34* (2006.01)
(52) U.S. Cl. .......................... 429/7; 429/163
(58) Field of Classification Search .............. 429/7, 162, 429/163, 176, 177
See application file for complete search history.

(56) References Cited

U.S. PATENT DOCUMENTS

| 7,132,196 B2 | 11/2006 | Morita et al. | |
| 2009/0246621 A1 | 10/2009 | Miebori | |
| 2009/0302804 A1* | 12/2009 | Park et al. | 320/128 |
| 2011/0244276 A1 | 10/2011 | Takeshita et al. | |

FOREIGN PATENT DOCUMENTS

| JP | 2005-100696 | | 4/2005 |
| JP | 2005142153 | | 6/2005 |
| JP | 2007157452 A | * | 6/2007 |
| JP | 2009-110803 | | 5/2009 |
| KR | 10-0659857 | | 12/2006 |
| KR | 10-0835743 | | 5/2008 |
| KR | 1020090075396 | | 7/2009 |

OTHER PUBLICATIONS

Korean Notice of Allowance issued on Nov. 28, 2011 in connection with Korean Patent Application Serial No. 10-2009-0116671 and Request for Entry of the Accompanying Office Action attached herewith.

* cited by examiner

*Primary Examiner* — Gregg Cantelmo
(74) *Attorney, Agent, or Firm* — Robert E. Bushnell, Esq.

(57) ABSTRACT

A battery pack includes a bare cell having a pair of first side portions, a pair of second side portions, and a pair of plane portions, each of which are opposite to each other. The second side portions and the plane portions are connected to ends of the first side portions. A protection circuit module is electrically connected to the bare cell. An inner frame exposes one side portion of the pair of first side portions and accommodates the bare cell. An outer frame exposes the pair of plane portions and accommodates the bare cell, the protection circuit module and the inner frame. In the battery pack, outer ribs extending away from the bare cell are further formed at the inner frame that comes in contact with the pair of second side portions of the bare cell so that the outer frame is surrounded by the outer ribs.

15 Claims, 4 Drawing Sheets

BATTERY PACK

CLAIM OF PRIORITY

This application makes reference to, incorporates the same herein, and claims all benefits accruing under 35 U.S.C. §119 from an application earlier filed in the Korean Intellectual Property Office on 30 Nov. 2009 and there duly assigned Serial No. 10-2009-0116671.

BACKGROUND OF THE INVENTION

1. Field of the Invention

An aspect of the present invention relates to a battery pack, and more particularly, to a battery pack capable of preventing movements of components by enhancing shape matching when the components in the battery pack are assembled.

2. Description of the Related Art

As the development and demand of mobile devices have recently been increased, demands on secondary batteries as power sources have been rapidly increased.

SUMMARY OF THE INVENTION

It is therefore one aspect of the present invention to provide an improved battery pack which may be easily assembled and has a durable structure.

It is another aspect for this present invention to provide a battery pack in which outer ribs extending in the outer direction of a bare cell are respectively formed on at least one pair of sides opposite to each other in an inner frame, and an outer frame is inserted into a space disposed between the outer ribs, so that it is possible to enhance shape matching when the inner and outer frames are assembled, thereby preventing their relative movements.

According to an aspect of the present invention, there is provided a battery pack including a bare cell having a pair of first side portions opposite to each other, a pair of second side portions opposite to each other, and a pair of plane portions opposite to each other, the second side portions and the plane portions being connected to ends of the first side portions; a protection circuit module electrically connected to the bare cell; an inner frame provided between the bare cell and the protection circuit module, the inner frame exposing one side portion of the pair of first side portions and the inner frame accommodating the bare cell; and an outer frame exposing the pair of plane portions, the outer frame accommodating the bare cell, the protection circuit module and the inner frame, wherein outer ribs extending toward the pair of plane portions of the bare cell are further formed at the inner frame that comes in contact with the pair of second side portions of the bare cell so that the outer frame is surrounded by the outer ribs.

An electrode terminal may be formed at one side portion of the second side portions.

The outer ribs may be formed at a pair of sides of the inner frame, which come in contact with the pair of second side portions of the bare cell, respectively.

At least one pair of inner ribs opposite to each other may be formed at the inner frame to extend toward the plane portions of the bare cell.

An unfolding portion unfoldable to the outside of the bare cell may be further formed at one region of the inner frame, which comes in contact with each of the pair of second side portions of the bare cell.

The outer frame may have an upper outer frame and a lower outer frame, and may be formed by connecting the upper and lower outer frames to each other. Alternatively, the outer frame may be formed into a single body.

The battery pack may further include a protruding portion formed at an outside of the inner frame, which comes in contact with each of the second side portions of the bare cell, and a groove portion formed at an inside of the outer frame, which corresponds to the protruding portion.

The battery pack may further include a groove portion formed at an outside of the inner frame, which comes in contact with each of the second side portions of the bare cell, and a protruding portion formed at an inside of the outer frame, which corresponds to the groove portion.

At least one projection positioned vertically to the plane portions of the bare cell may be formed at the inner frame that comes in contact with the first side portions of the bare cell, and at least one hole may be formed at the outer frame to correspond to the projection.

The inner frame and the protection circuit module may be attached to each other by welding or insulating tape.

The inner and outer frames may be formed of any one selected from the group consisting of polycarbonate (PC), polyethylene terephthalate glycol (PETG), polyethylene (PE), polypropylene (PP) and acrylonitrile-butadiene-styrene (ABS).

The battery pack may further include a taping member for surrounding the outside of the bare cell and the outer frame.

As described above, in a battery pack according to an embodiment of the present invention, outer ribs extending in the outer direction of a bare cell are respectively formed on at least one pair of sides opposite to each other in an inner frame, and an outer frame is inserted into a space between the outer ribs, so that it is possible to enhance shape matching when the inner and outer frames are assembled, thereby preventing their movements. Accordingly, the battery pack can be firmly fixed, and its reliability can be improved.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
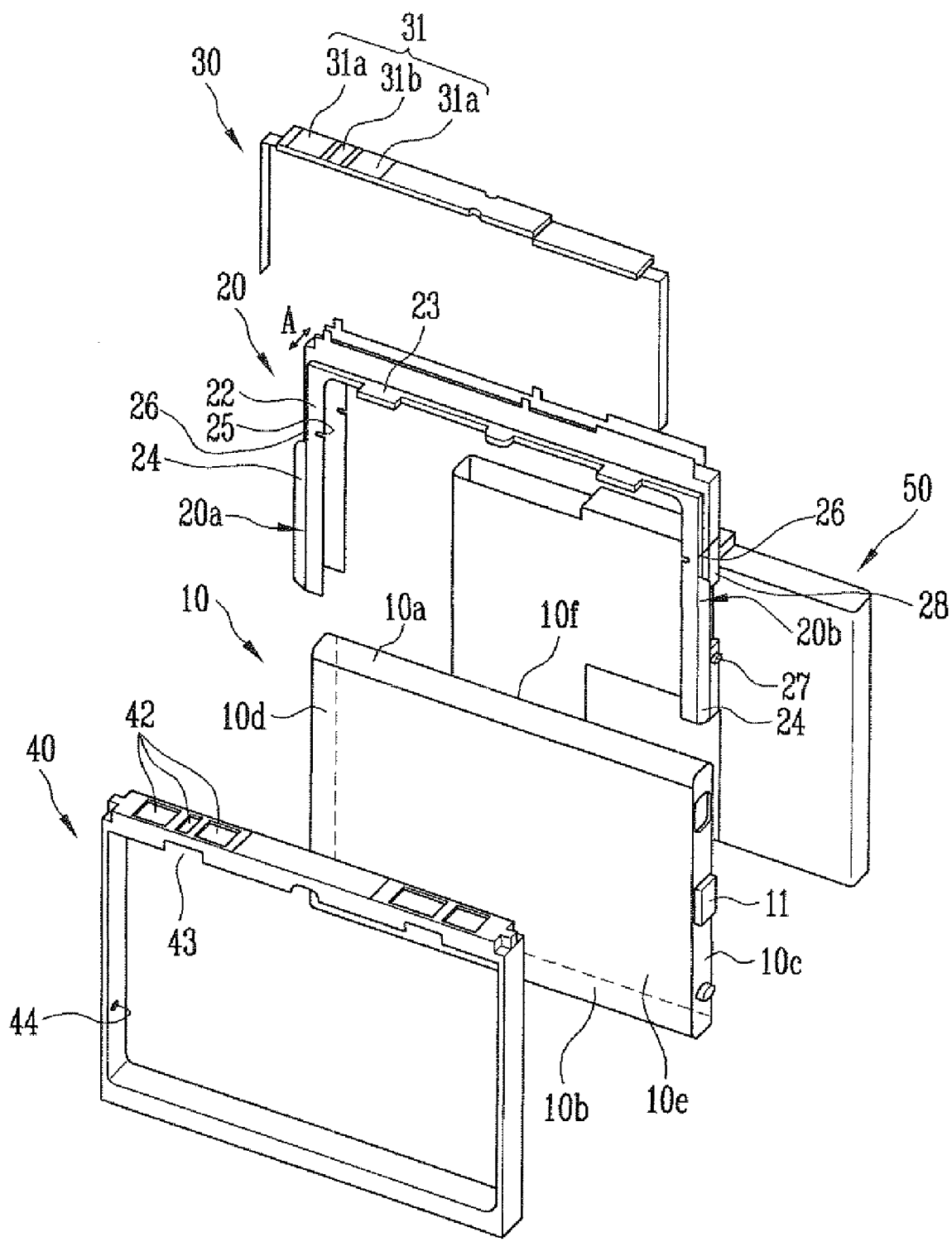
FIG. 1 is an exploded perspective view of a battery pack constructed as an embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. In addition, when an element is referred to as being "on" another element, it can be directly on another element or be indirectly on another element with one or more intervening elements interposed therebetween. Also, when an element is referred to as being "connected to" another element, it can be directly connected to another element or be indirectly connected to another element with one or more intervening elements interposed therebetween. Hereinafter, like reference numerals refer to like elements.

Demands on secondary battery for use as power sources have rapidly increased. Battery packs are generally classified into a hard battery pack and an inner battery pack based on how the secondary battery is mounted within a case. Among the two types of battery pack, the inner battery pack is mounted inside an external device, and then hidden by a cover which forms a part of the external device. Therefore, it is inconvenient to mount the inner battery pack in the interior of the external device. It is however, easier for a designer to design an inner battery pack, and the inner battery pack should have a high degree of compatibility with the external devices.

An inner battery pack generally includes a bare cell that can be repeatedly charged and discharged; a protection circuit module electrically connected to the bare cell so as to control charge or discharge of the bare cell, and to block a circuit when the bare cell is overcharged or overdischarged; a resin filled in the gap disposed between the bare cell and the protection circuit module; and an outer frame for packing the bare cell, protection circuit module and the resin so that the inner battery pack is mounted in an external device.

In order to manufacture such a battery pack, in the state that an electrode lead and a PTC thermistor are connected to a positive electrode and a negative electrode, respectively, a circuit protection module is electrically connected to the lead and the PTC thermistor. Then, the protection circuit module and the bare cell are mechanically fixed to each other by filling a resin in the gap disposed between the protection circuit module and the bare cell so that the protection circuit module is not separated from the bare cell. The bare cell and the protection circuit module, which are formed into a single body, are packed by an outer frame formed to be mounted in an external device. Here, the outer frame is integrally molded with the bare cell, the protection circuit module and the resin by using another resin.

Battery packs may be manufactured in various shapes in accordance with customers' demands on their appearances. Recently, it has been required to develop battery packs that easily perform the assembly between components and has a strong shape.

FIG. 1 is an exploded perspective view of a battery pack constructed as an embodiment of the present invention.

Referring to FIG. 1, the battery pack of this embodiment includes a bare cell 10 having an electrode assembly and a can or pouch for surrounding the outer circumferential surface of the electrode assembly; a protection circuit module 30 electrically connected to the bare cell 10; a '⊏' shaped inner frame 20; and a '⊐' shaped outer frame 40.

The bare cell 10 has a pair of first side portions 10a and 10b facing toward and opposite to each other; a pair of second side portions 10c and 10d connected to end portions of the first side portions 10a and 10b and opposite to each other; a pair of plane portions 10e and 10f facing toward and opposite to each other; and an electrode terminal 11 exposed to one side portion 10c of the second side portions 10c and 10d.

The inner frame 20 has three sides respectively corresponding to the pair of second side portions 10c, 10d and one of first side portions 10a, 10b. The outer frame 40 has four sides respectively corresponding to the pair of second side portions 10c, 10d and the pair of first side portions 10a, 10b.

The inner frame 20 is formed in a '⊏' shape to expose one side portion 10b of the pair of first side portions 10a and 10b in the bare cell 10 and the pair of plane portions 10e and 10f. The inner frame 20 may cover the second side portions 10c and 10d and one first side portion 10a. The protection circuit module 30 is mounted on the outside of the inner frame 20. At this time, the inner frame 20 and the protection circuit module 30 may be attached to each other by welding or insulating tape. Outer ribs 24 extending from edges 20a, 20b of the inner ribs 22 and extending away from the bare cell 10 are further formed at a portion of the inner frame 20 which is in contact with the pair of second side portions 10c and 10d of the bare cell 10. The outer ribs 24 may extend from the inner frame 20 and extend away from the bare cell 10. The portion of the inner frame 20 may be in direct contact with the pair of second side portions 10c and 10d of the bare cell 10. The inner frame 20 has a side portion 28 connecting both of the inner ribs 22 and the outer ribs 24.

The outer frame 40 is formed in a '⊓' shape to expose the pair of plane portions 10e and 10f, while surrounding other portions of the bare cell 10, the protection circuit module 30 and the inner frame 20. A terminal exposing portion 42 may be provided to the outer frame 40. Here, the terminal exposing portion 42 allows an external input/output terminal portion 31, which will be described later, to be exposed to the exterior of the outer frame 40.

The outer frame 40 is inserted into a space between the outer ribs 24 and the side portion 28 of the inner frame 22, so that it is possible to enhance shape matching when the inner and outer frames 20 and 40 are assembled, thereby preventing their relative movements. Accordingly, the battery pack can be firmly fixed, and its reliability can be improved.

The outer frame 40 may be formed into a single body. At this time, the inner and outer frames 20 and 40 may be connected to each other by at least one connecting member having a protruding portion 27 and a groove portion 44 corresponding to the protruding portion 27. Inner ribs 22 extending toward the plane portions 10e and 10f of the bare cell 10 may be additionally formed on at least one pair of sides opposite to each other in the inner frame 20. Thus, the inner frame 20 can be fixed to the bare cell 10 by using the inner ribs 22 without an additional separate adhesive member.

An unfolding portion 26 through which the inner frame 20 is unfolded to the outside of the bare cell 10 may be further formed at one region of the inner frame 20, which comes in contact with each of the second side portions 10c and 10d of the bare cell 10. In order to easily perform the unfolding, groove portions 25 are respectively formed at regions of the inner ribs 22 of the inner frame 20, which are formed parallel with and corresponding to the unfolding portion 26.

A projection 23 positioned vertically to the plane portions 10e and 10f of the bare cell 10 is formed at a portion of one side of the inner frame 20 which is in contact with the first side portion 10a of the bare cell 10, and a recess 43 is formed at the outer frame 40 to correspond to the projection 23. Thus, the inner and outer frames 20 and 40 can be firmly connected to each other by coupling the recess 43 to the projection 23.

Here, the inner and outer frames 20 and 40 may be formed of any one selected from the group consisting of polycarbonate (PC), polyethylene terephthalate glycol (PETG), polyethylene (PE), polypropylene (PP) and acrylonitrile-butadiene-styrene (ABS).

The electrode terminal 11 is provided to one side portion 10c of the second side portions 10e and 10d in the bare cell 10. The electrode terminal 11 is electrically connected to the protection circuit module 30. The inner frame 20 is positioned between the bare cell 10 and the protection circuit module 30 so that all the region except for the electrode terminal 11 are electrically isolated from the protection circuit module 30. The protection circuit module 30 includes an electrical connection terminal (not shown) provided for the purpose of electrical connection with the electrode terminal 11 of the bare cell 10. The protection circuit module 30 further includes an external input/output terminal portion 31 positioned on the electrical connection terminal.

The bare cell 10 will be briefly described. The bare cell 10 may be a can-type bare cell or pouch-type bare cell. In this embodiment, the can-type bare cell will be described as an example of the bare cell 10.

The bare cell 10 includes an electrode assembly and a can for accommodating the electrode assembly. The electrode assembly includes a positive electrode plate having both surfaces coated with a positive electrode active material; a separator; and a negative electrode plate having both surfaces coated with a negative electrode active material. Electrode tabs are joined with regions extended from the positive and negative electrode plates, respectively. One of the electrode tabs is connected to the can or a cap plate. The other of the electrode tabs is connected to the electrode terminal 11 and extracted to the exterior of the can so as to be electrically connected to the protection circuit module 30.

The protection circuit module 30 is physically connected to the electrode terminal 11 of the bare cell 10 and electrically connected to the electrode terminal 11 of the bare cell 10. The protection circuit module 30 includes a printed circuit board (of which reference numeral not shown). A protection circuit is disposed on the printed circuit board, and the protection circuit may be such as a circuit for controlling charge and discharge of a battery to have a uniform charge state or a circuit for preventing overdischarge and overcharge. The protection circuit module 30 may have a protection element such as a thermistor or temperature fuse. When the voltage or current of a battery are higher than the specified voltage or current due to the high temperature or overcharge/overdischarge of the battery, the protection element cuts off the current, so that it is possible to prevent risks such as explosion and firing of the battery. The protection circuit module 30 has an electrical connection terminal (not shown) provided to allow the electrode tabs of the bare cell 10 to be electrically connected to the printed circuit board.

The protection circuit module 30 is used to transmit and receive electrical signals between the bare cell 10 and an external device (not shown). To this end, the protection circuit module 30 further includes an external input/output terminal 31 positioned on the electrical connection terminal. Here, the external input/output terminal 31 serves as an electrical medium between the protection circuit module 30 and the external device. The external input/output terminal portion 31 includes metal portions 31a and a housing portion 31b that surrounds the metal portions 31a. The metal portions 31a are plated with gold (Au) that is a conductive material so as to allow electrical signals to be transmitted/received between the bare cell 10 and the external device. The housing portion 31b may be made of plastic that is an insulative material so that the metal portions 31a spaced apart from each other at a predetermined interval in the housing portion 31b are electrically isolated from each other.

As described above, the 'ロ' shaped outer frame 40 for forming a portion of the profile of the battery pack is joined with the bare cell 10 electrically connected to the protection circuit module 30 with the 'ㄷ' shaped inner frame 20 interposed therebetween, and the bare cell 10 and an outside of the outer frame 40 are surrounded by a taping member 50, thereby reinforcing the joint between the bare cell 10 and the external frame 40.

Figure 2A:
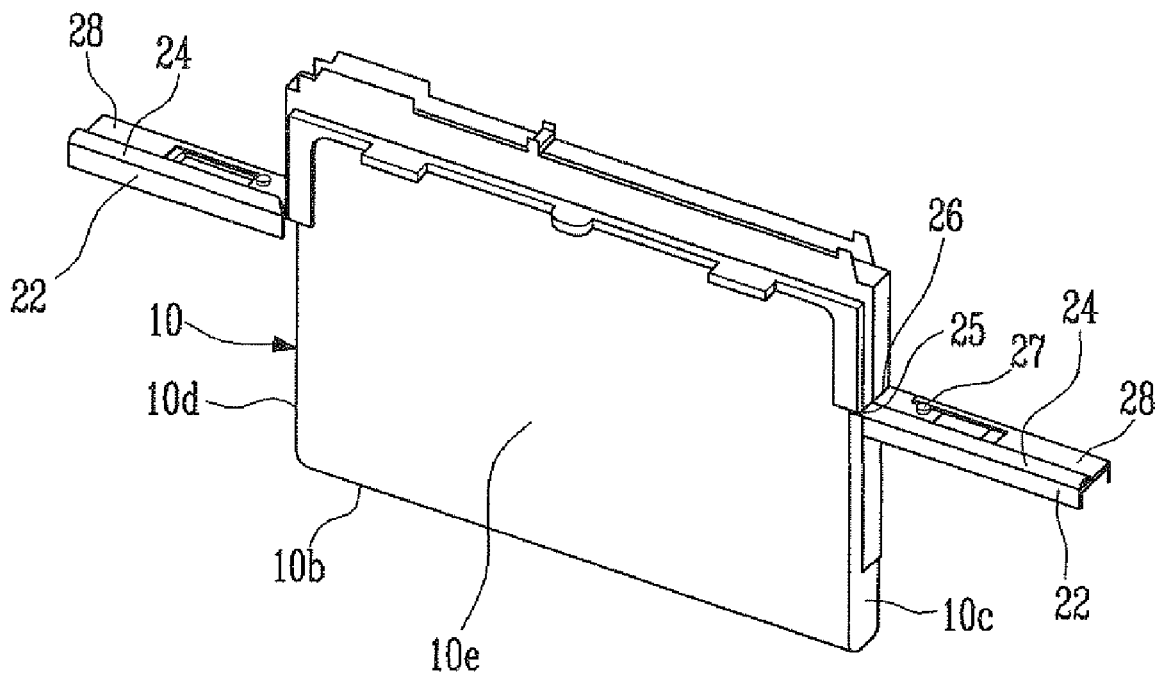
FIG. 2A through 2E are perspective views illustrating assembling processes of the battery pack constructed as the embodiment of the present invention.

FIG. 2A through 2E are perspective views illustrating assembling processes of the battery pack constructed as the embodiment of the present invention. FIG. 3 is a sectional view taken along line I-I' in FIG. 2D.

Referring to FIGS. 2A through 2E and 3, the unfolding portion 26 through which the inner frame 20 is unfolded to the outside of the bare cell 10 may be further formed at the one region of the inner frame 20, which comes in contact with each of the second side portions 10c and 10d of the bare cell 10.

In order to easily perform the unfolding, groove portions 25 may be respectively formed at regions of the inner ribs 22 of the inner frame 20, which are parallel with the unfolding portion 26. When the inner frame 20 is connected to the bare cell 10, the unfolding portion 26 is unfolded to the outside of the bare cell 10 so that the inner frame 20 can be easily connected to the bare cell 10 (FIG. 2A).

Figure 2B:
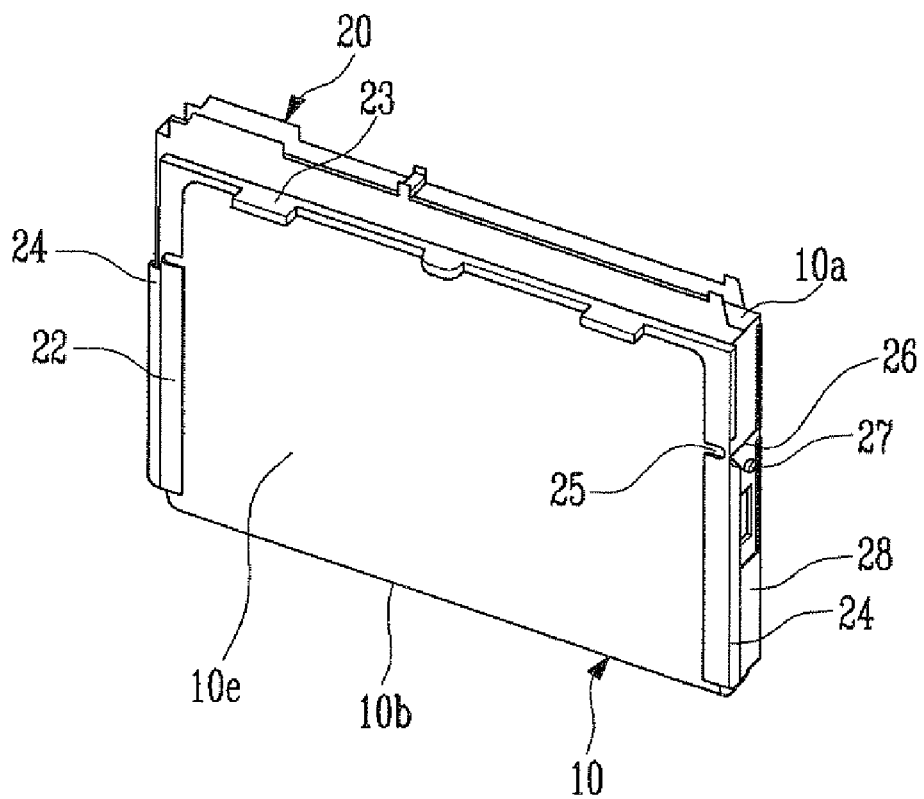
Figure 3:
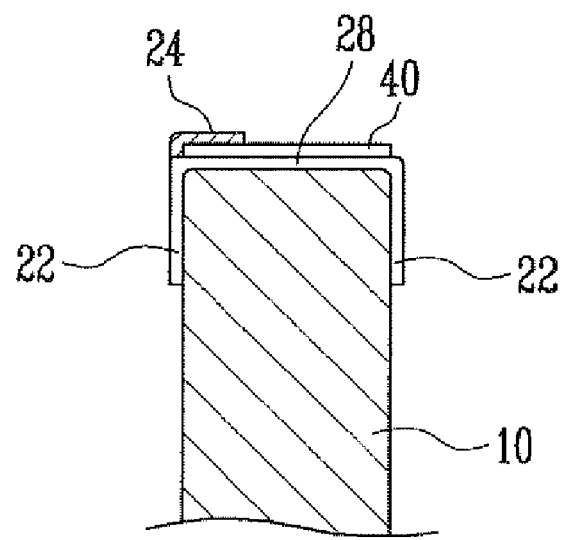
FIG. 3 is a sectional partial view taken along line I-I' in FIG. 2D.

If the inner frame 20 is positioned at the first side portion 10a of the bare cell 10, the unfolded region comes in contact with the each of the second side portions 10c and 10d of the bare cell 10 (FIG. 2B). Accordingly, the inner frame 20 can be easily connected to the bare cell 10.

In other words, as shown in FIG. 2A, the inner frame 20 is folded along the unfolding portion 26 during the connection of the bare cell 10 and the inner frame 20. As shown in FIG. 2B, after the inner frame 20 is positioned at one of the first side portions 10a, 10b, the inner frame 20 is unfolded along the unfolding portion 26 and the previously folded portion of the inner frame 20 is also in contact with the bare cell 10.

Figure 2C:
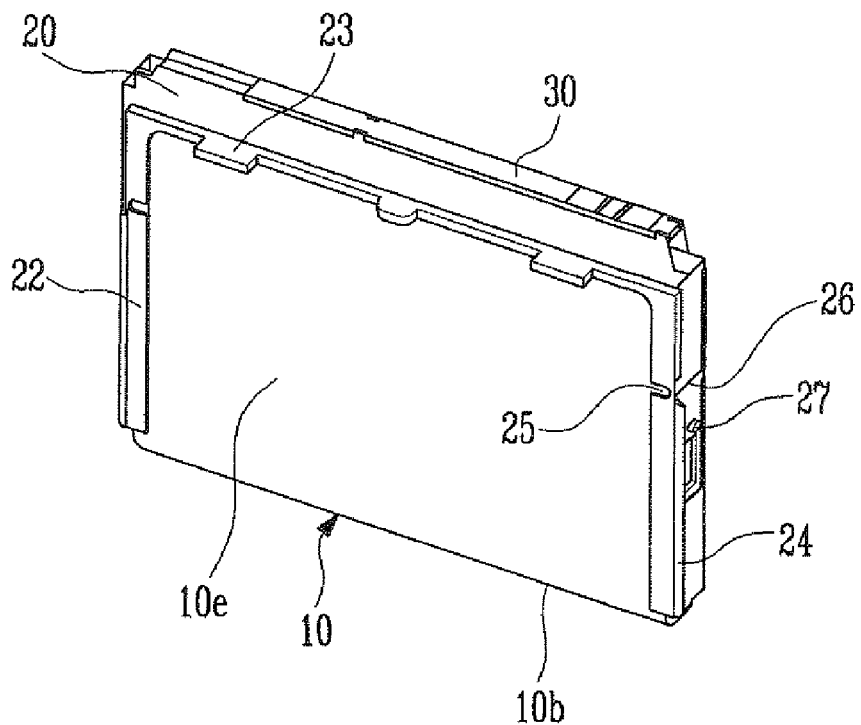

The protection circuit module 30 is mounted on the outside of the inner frame 20 formed to expose one side portion 10b of the pair of first side portions 10a and 10b and the pair of plane portions 10e and 10f in the bare cell 10. At this time, the inner frame 20 and the protection circuit module 30 may be attached to each other by welding or an electrically insulating tape. The outer ribs 24 extending from the inner frame 20 and extending away from the bare cell 10 are further formed at portions of the inner frame 20 which are in contact with the pair of second side portions 10c and 10d of the bare cell 10 (FIG. 2C).

The outer frame 40 accommodates the bare cell 10, the protection circuit module 30 and the inner frame 20, while exposing the pair of plane portions 10e and 10f of the bare cell 10. The outer frame 40 is inserted into a space between the outer ribs 24 extending away from the bare cell 10 and the side portion 28 of the inner frame 20, so that it is possible to enhance shape matching when the inner and outer frames 20 and 40 are assembled, thereby preventing their relative movements. The outer ribs 24 are bent toward the outer frame 40 in order to firmly press the outer frame 40 to the side portion 28 of the inner frame 20. Accordingly, the battery pack can be firmly fixed, and its reliability can be improved.

Figure 2D:
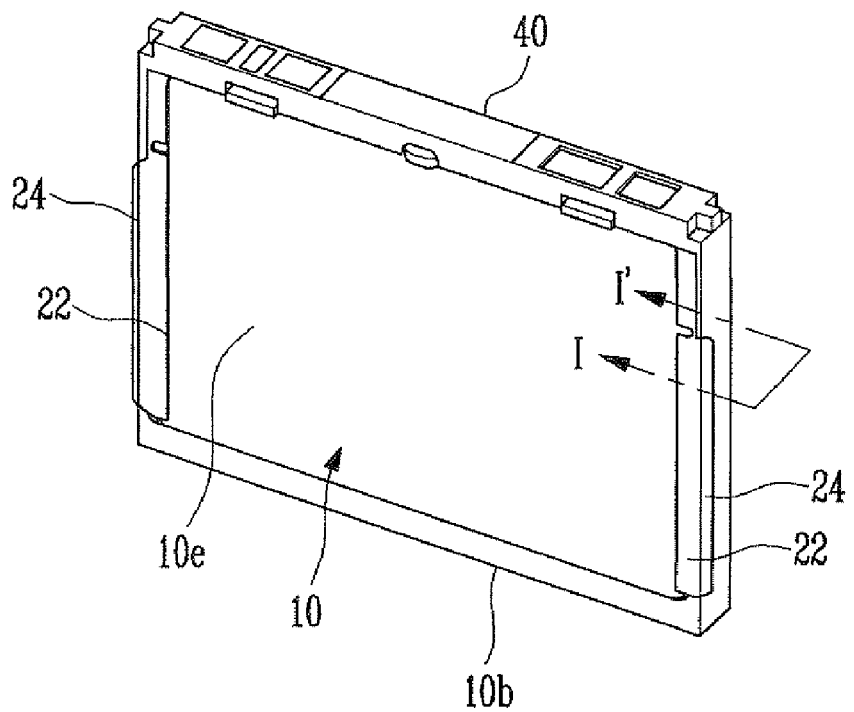

The protruding portion 27 is formed at the outside portion of the inner frame 20 which comes in contact with each of the plane portions 10e and 10f of the bare cell 10, and the groove portion 44 is formed at the inside of the outer frame 40, which corresponds to the protruding portion 27, so that the protruding portion 27 may be forcibly fitted into the groove portion 44 (FIGS. 2D and 3).

After a core pack is inserted into a 'ロ' shaped outer frame 40, a taping member 50 may surround the outside of the assembled core pack and outer frame 40. The taping member 50 is used to reinforce the assembled state of the core pack and the outer frame 40. The taping member 50 may have the shape that partially surrounds only the connection portion between the outer frame 40 and the core pack, or may have the shape of a single sheet that surrounds the entire outer surface of the outer frame 40 and the core pack. Here, the shape of the taping member 50 is not particularly limited.

Figure 2E:
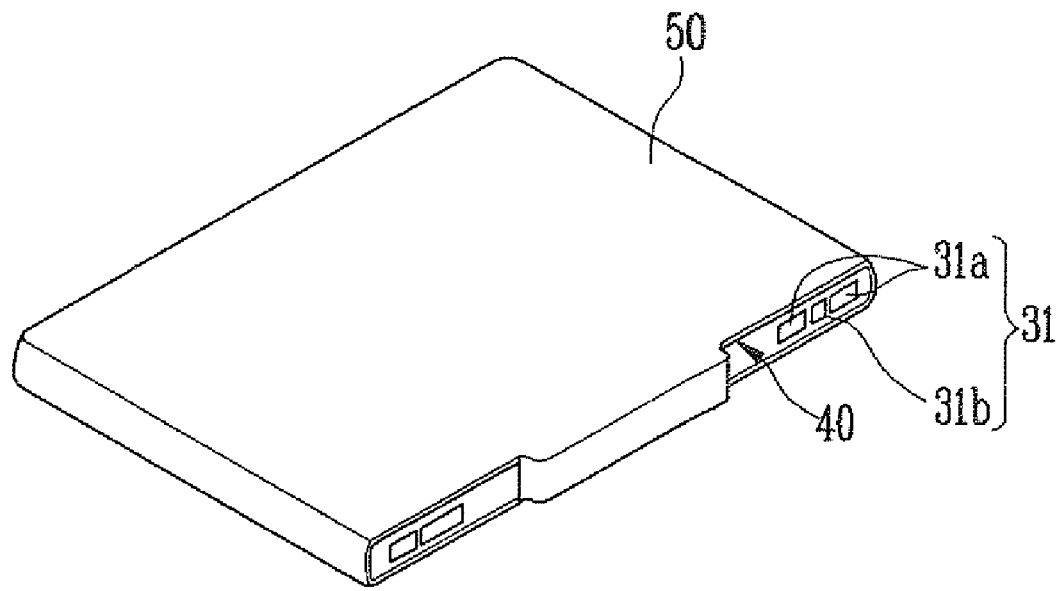

The taping member 50 may be a label for packaging, on which the discharge capacity of a secondary battery, its manufactured date and the like are printed. In addition, the taping member 50 has a function of protecting or insulating the secondary battery. The material of the label for packaging may include any one of synthetic resin, paper and the like, which are generally used as packaging materials. Preferably, a shrinkable tube is used as the material of the label for packaging (FIG. 2E).

In this embodiment, it has been described that the protruding portion 27 and the groove portion 44 are formed at the inner frame 20 and the outer frame 40, respectively. Alternatively, the inner and outer frames 20 and 40 may be assembled by connection of a groove portion formed at an outside of the inner frame 20 and a protruding portion formed at an inside of the outer frame 40, which corresponds to the groove portion.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A battery pack, comprising:
a bare cell having a pair of first side portions opposite to each other, a pair of second side portions opposite to each other, and a pair of plane portions opposite to each other, the second side portions and the plane portions being connected to ends of the first side portions;
a protection circuit module electrically connected to the bare cell;
an inner frame provided between the bare cell and the protection circuit module, the inner frame exposing one side portion of the pair of first side portions and the inner frame accommodating the bare cell; and
an outer frame exposing the pair of plane portions, the outer frame accommodating the bare cell, the protection circuit module and the inner frame,
with outer ribs which extend from the inner frame and extend away from the bare cell being formed at portions of the inner frame which are in contact with the pair of second side portions of the bare cell so that the outer frame is surrounded by the outer ribs.

2. The battery pack according to claim 1, wherein an electrode terminal is formed at one side portion of the second side portions.

3. The battery pack according to claim 1, wherein the outer ribs are formed at a pair of sides of the inner frame, which come in contact with the pair of second side portions of the bare cell, respectively.

4. The battery pack according to claim 1, wherein at least one pair of inner ribs opposite to each other are formed at the inner frame to extend toward the plane portions of the bare cell.

5. The battery pack according to claim 1, wherein an unfolding portion unfoldable to the outside of the bare cell is further formed at one region of the inner frame, which comes in contact with each of the pair of second side portions of the bare cell.

6. The battery pack according to claim 1, wherein the outer frame has an upper outer frame and a lower outer frame, and is formed by connecting the upper and lower outer frames to each other.

7. The battery pack according to claim 1, wherein the outer frame is formed into a single body.

8. The battery pack according to claim 7, further comprising a protruding portion formed at an outside of the inner frame, which comes in contact with each of the second side portions of the bare cell, and a groove portion formed at an inside of the outer frame, which corresponds to the protruding portion.

9. The battery pack according to claim 7, further comprising a groove portion formed at an outside of the inner frame, which comes in contact with each of the second side portions of the bare cell, and a protruding portion formed at an inside of the outer frame, which corresponds to the groove portion.

10. The battery pack according to claim 1, wherein at least one projection positioned vertically to the plane portions of the bare cell is formed at the inner frame that comes in contact with the first side portions of the bare cell, and at least one hole is formed at the outer frame to correspond to the projection.

11. The battery pack according to claim 1, wherein the inner frame and the protection circuit module are attached to each other by welding.

12. The battery pack according to claim 1, wherein the inner frame and the protection circuit module are attached to each other by insulating tape.

13. The battery pack according to claim 1, wherein the inner and outer frames are formed of any one selected from the group consisting of polycarbonate (PC), polyethylene terephthalate glycol (PETG), polyethylene (PE), polypropylene (PP) and acrylonitrile-butadiene-styrene (ABS).

14. The battery pack according to claim 1, further comprising a taping member for surrounding the outside of the bare cell and the outer frame.

15. A battery pack, comprising:
a bare cell having a plurality of major surfaces separated by a plurality of minor surfaces;
a protection circuit module electrically connected to the bare cell;
an inner frame provided between the bare cell and the protection circuit module, the inner frame surrounding three adjacent minor surfaces of the bare cell;
an outer frame covering all of the plurality of the minor surfaces, the protection circuit module and the inner frame;
inner ribs extending from the inner frame toward the plurality of major surfaces and being in contact with the plurality of major surfaces; and
outer ribs extending from the inner frame and extending away from the bare cell, and the outer ribs bending toward the outer frame and pressing the outer frame to the inner frame.

\* \* \* \* \*